United States Patent [19]
Roach

[11] 3,884,658
[45] May 20, 1975

[54] AIR CLEANER FOR SUPERCHARGED ENGINES

[75] Inventor: Charles J. Roach, Brooklyn, N.Y.

[73] Assignee: Pall Corporation, Glen Cove, N.Y.

[22] Filed: Apr. 18, 1972

[21] Appl. No.: 245,166

[52] U.S. Cl. .................. 55/315; 55/345; 55/439; 55/468; 55/482; 60/11; 123/119 C
[51] Int. Cl. ............................................ B01d 50/00
[58] Field of Search ............ 55/331, 337, 345, 347, 55/348, 439, 457, 468, 467, 473, 482, 315, 498; 123/119 C, 119 CA, 119 DB, 119 CD, 119 CE, 119 CF, 119 CG; 60/11, 12, 13

[56] References Cited
UNITED STATES PATENTS

| | | | |
|---|---|---|---|
| 2,434,726 | 1/1948 | Udale | 123/119 C X |
| 2,554,343 | 5/1951 | Pall | 210/510 X |
| 3,494,114 | 2/1970 | Nelson et al. | 55/482 |
| 3,520,114 | 7/1970 | Pall et al. | 55/347 |
| 3,535,853 | 10/1970 | Brown et al. | 55/337 |
| 3,577,726 | 5/1971 | Wagner | 60/13 |

FOREIGN PATENTS OR APPLICATIONS 935,041   8/1963   United Kingdom.................. 55/337

Primary Examiner—Frank W. Lutter
Assistant Examiner—William Cuchlinski, Jr.

[57] ABSTRACT

An air cleaner assembly is provided for supercharged engines including a supercharger and turbocharger compressor, comprising a vortex air cleaner upstream of the supercharger and turbocharger compressor, and a barrier filter downstream of the supercharger and turbocharger compressor.

8 Claims, 5 Drawing Figures

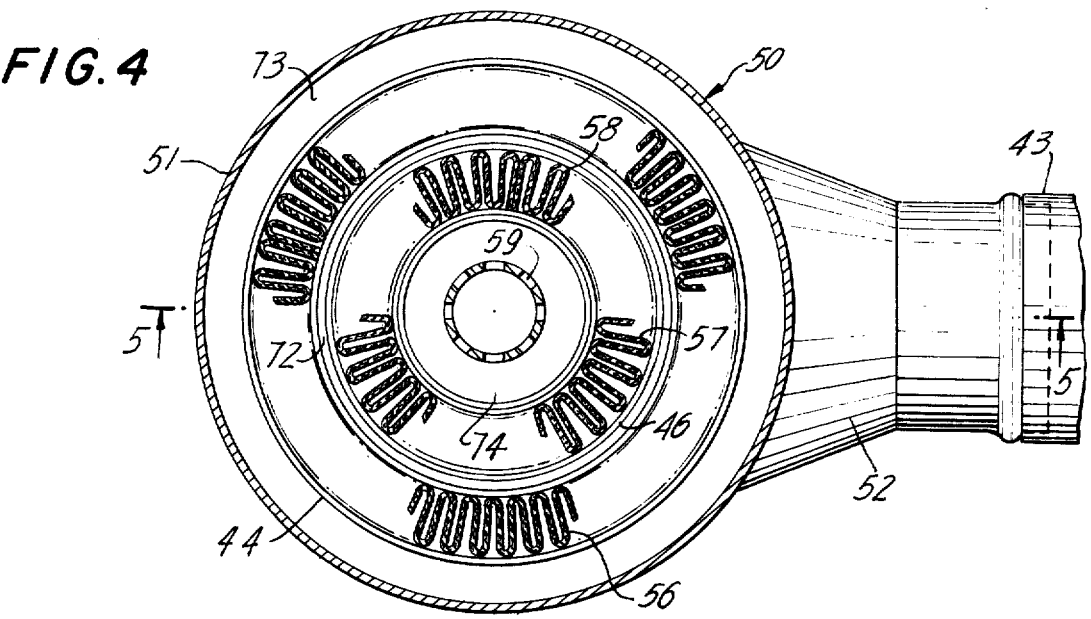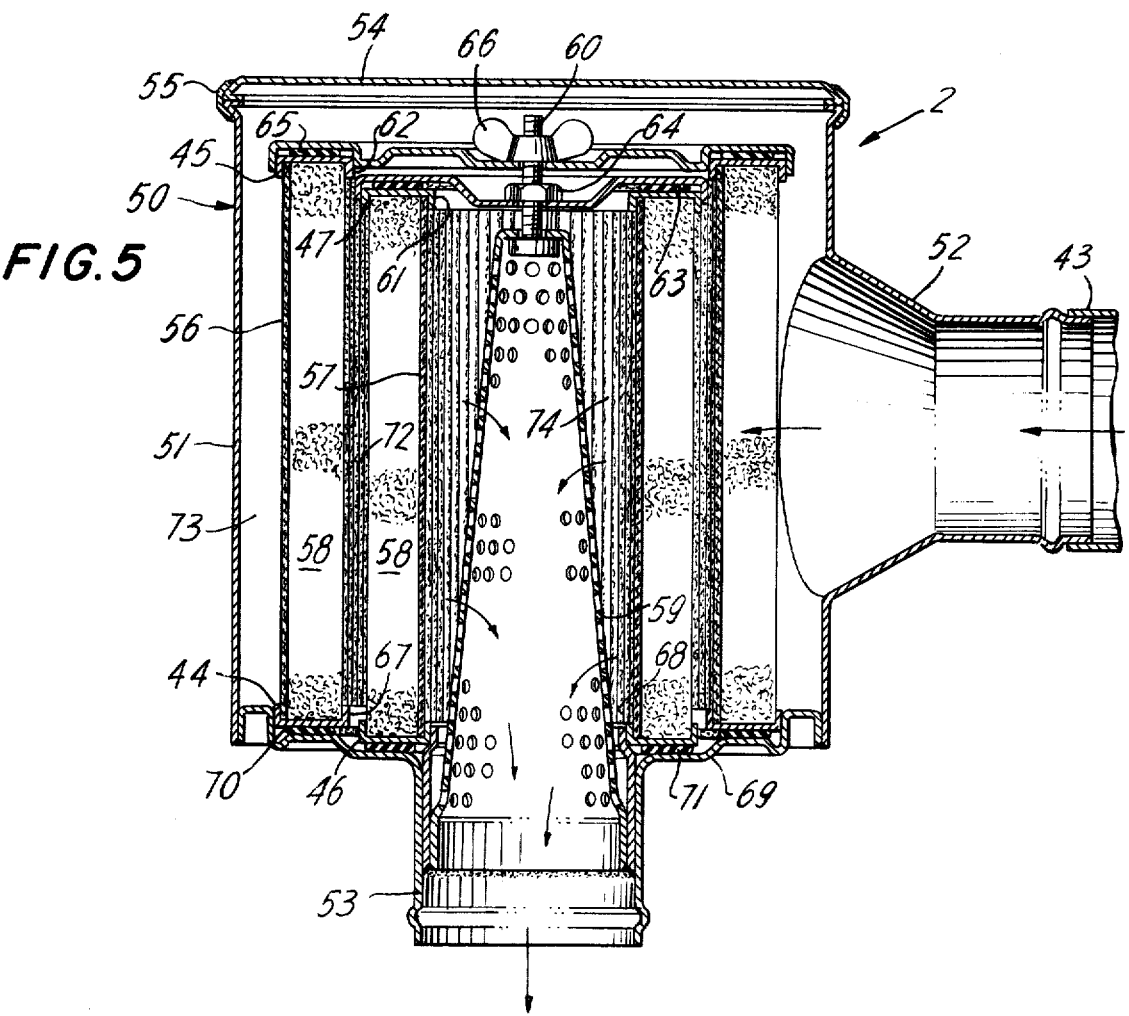

AIR CLEANER FOR SUPERCHARGED ENGINES

Internal combustion supercharged and naturally aspirated diesel and engines require an air cleaner to make sure that the air that is fed to the engine is freed from contaminants that would otherwise damage or deleteriously affect the engine. The usual type of air cleaner for such engines is a dry-type cleaner, including a precleaner followed by a barrier filter. The contaminants removed by the precleaner can be unloaded by a gravity unloader valve, or by induced scavenge, using a blower or an air or exhaust gas ejector. Following the barrier filter, the air passes through the supercharger compressor, and thence through an after-cooler to the engine.

Such systems place a limit on the manifold pressure available according to the pressure drop across the precleaner and filter, and this pressure drop increases as the filter becomes loaded with contaminants that cannot be removed until the system is shut down and the filter is replaced or cleaned. Superchargers are employed to increase the inlet manifold density, thereby increasing the BMEP, Brake Mean Effective Pressure, and horsepower. An after-cooler is used to remove the adiabatic heat of compression which if not removed reduces the inlet manifold density. The restriction on manifold pressure also imposes a like restriction on manifold density, and of course the maximum inlet manifold density and pressure can be obtained only initially, when the filter is clean, since they continually decrease as the filter loads up with contaminants.

In accordance with the invention, it has been determined that a higher manifold pressure and manifold density can be obtained if the barrier filter is located downstream of the supercharger compressor, rather than upstream, as is conventional. The air cleaner assembly in accordance with the invention comprises a precleaner upstream of the supercharger compressor, and a barrier filter downstream of the supercharger compressor. The precleaner is a vortex-type air cleaner. The barrier filter, since it is on the hot side of the compressor, is capable of withstanding elevated temperatures of at least 250° up to about 350°F., and higher.

The placing of the barrier filter on the high-pressure side of the supercharger gives an air cleaner system which has a higher dirt capacity, improved high-altitude performance and improved inlet blower performance on two-cycle engines, which can increase horsepower and which can continue to operate at a higher pressure drop across the air cleaner. This makes it possible, for performance characteristics equivalent to a conventional air cleaner system, to construct the air cleaner system of the invention to a smaller package volume, or to a smaller after-cooler volume, or to achieve a lower air pumping cost.

FIG. 4 is a cross-sectional view of the barrier filter component of the air cleaner assembly of FIG. 1, taken along the lines 4—4, and looking in the direction of the arrows;

FIG. 5 is a longitudinal section through the barrier filter component, taken along the lines 5—5 of FIG. 4, and looking in the direction of the arrows.

Figure 1:
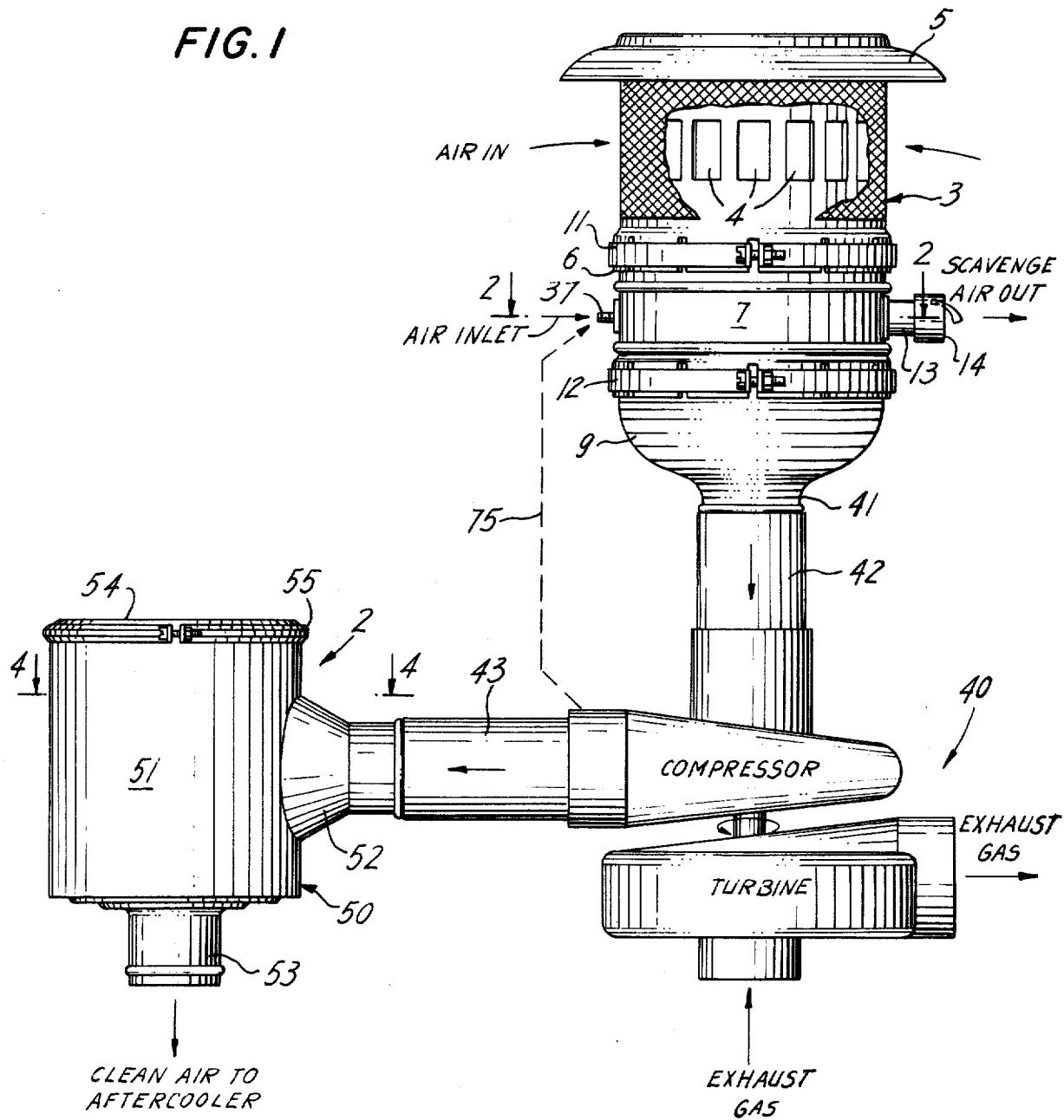
FIG. 1 is a plan view, in elevation, of a supercharger compressor, fitted with an air cleaner assembly in accordance with the invention.
Figure 2:
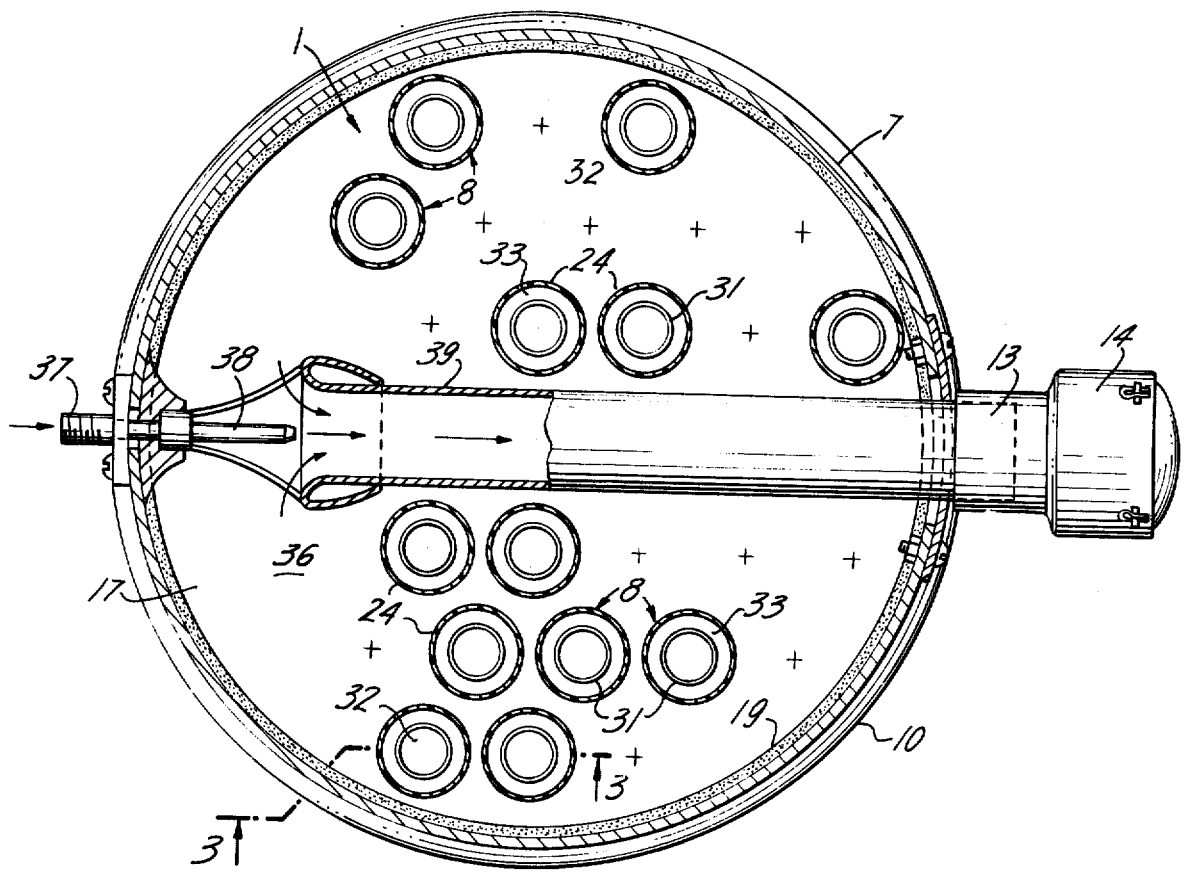
FIG. 2 is a cross-sectional view of the precleaner component of the air cleaner assembly of FIG. 1, taken along the lines 2—2 and looking in the direction of the arrows.
Figure 3:
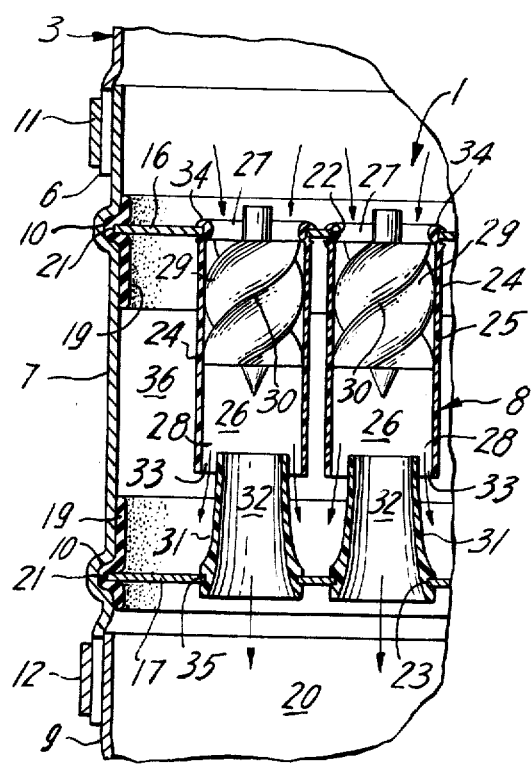
FIG. 3 is a longitudinal section through the precleaner component, taken along 3—3 lines 3-3 of FIG. 2, and looking in the direction of the arrows.

The precleaner component of the air cleaner assembly of the invention comprises one or a plurality of vortex-type air cleaners. A single vortex-type air cleaner can be used, but it is usually preferable to employ an array of such cleaners, as described for example in U.S. Pat. No. 3,520,114, dated July 14, 1970; U.S. Pat. No. 3,590,560, dated July 6, 1971; and U.S. Pat. No. 3,611,679, dated Oct. 12, 1971, to David B. Pall et al. The vortex air cleaner array has a sufficient flow capacity to meet the air supply requirements of the engine in connection with which it is used.

The term "vortex air cleaner" as used herein refers to an air cleaner which comprises a tubular air cleaner body having a central passage with an inlet and an outlet at opposite ends; a vaned deflector adjacent the inlet for creating a vortex stream in the influent air to concentrate any contaminant particles in the air at the periphery of the passage, and clean the air at the center of the passage; and an outlet member having a central clean air passage communicating with the central passage of the tubular body and disposed within the passage at the outlet, the exterior wall of the outlet member defining a generally annular contaminant scavenge passage within the central passage of the tubular body through which pass contaminant particles while relatively clean air at the center of the passage passes through the central clean air passage of the outlet member.

Vortex air cleaners have the advantage that the pressure drop between the inlet and outlet is quite low, and this is coupled with a high cleaning efficiency. Thus, they cause little power loss to the engine. Furthermore, if a scavenge flow of air is employed to sweep contaminant particles from the assembly, efficiencies comparable to those obtained by a cyclone separator can be obtained, and the unit becomes self-cleaning.

Since vortex air cleaners have relatively low pressure drop, and thus cause little power loss to the engine, they are in use in an array of such air cleaners on aircraft, wherein the problem of removing dust or dirt from air entering an aircraft engine is particularly acute. The cleaning efficiency insignificantly decreases and the pressure drop significantly decreases relatively, if a plurality of vortex air cleaners are used together, in parallel, in an array.

The term "vortex air cleaner array" as used herein refers to an assembly of vortex air cleaners mounted together as a unit, with their axes aligned in parallel, or a group of such assemblies. The vortex air cleaners are normally supported between a pair of plates which hold the bodies of the vortex air cleaners with their dirty air inlets and clean air outlets in an exposed position beyond the plates. The scavenge passages for dirty air from the vortex air cleaners empty into a common scavenge chamber, which is normally defined between the support plates. A scavenge port is provided in a wall of the scavenge chamber, for the removal of dirty air laden with contaminant particles.

The tubular body of the vortex air cleaner can be substantially cylindrical, and of uniform diameter from the inlet to the outlet. However, improved separation and reduced pressure drop across the body can be obtained if the tubular body is tapered from the outlet to the inlet for at least a portion of its length, such that the outlet is of greater diameter than the inlet. This produces a widening air flow column therethrough.

The tube can be tapered along its entire length from the outlet to the inlet, thus assuming a slightly conical shape. In this construction, the vaned deflector would also be tapered, and somewhat conical in shape, to match the taper of the tubular body. The tubular body can also be tapered for only a portion of its length. For example, the tubular body could be substantially cylindrical for approximately the length of the vaned deflector, and the outward taper or flaring of the body can begin at a point immediately adjacent the downstream end of the deflector, and continue to the outlet.

The cone angle of the taper should be within the range of up to about 10°, and preferably is less than 3°. The tapered portion can be straight-sided or curved smoothly within these angle limits. The cone angle as used here is the angle between the two sides of the cone, and is thus twice the angle from one side, or the tangent thereto is curved, to the axis. The taper of the tubular body and the widening of the diameter of the columnar flow as described above improve the efficiency of separation, and reduce the pressure drop across the assembly.

The tubular body is preferably made by molding it from abrasion-resistant plastics, such as nylon, polyurethanes, polypropylene, polycarbonate, and polyphenylene oxide. Metals such as steel, stainless steel, nickel alloys and the like can also be used.

The vaned deflector for generating a vortex stream in the influent air is fixed in the tubular body at the inlet of the tube. The vaned deflector is adapted to generate a vortex stream into the air to throw contaminant particles to the periphery of the body, and ensure that they hit or closely approach the wall of the body before they reach the outlet.

The deflector is designed to impart sufficient force to the vortex stream for a given influent flow to attain this result. The deflector can be bonded in place in the tubular body or pressfitted into position, or integrally molded with the tubular body.

The deflector should be relatively long, and the vanes should occupy approximately one-half the effective length of the tube. However, it should not be so long that the pressure drop across the assembly is too high, and poor separation results.

The deflector can be composed of about three to six helical vanes, which are supported at their centers preferably on a central hub. Four vanes are preferred. The vanes, if desired, can be tapered in thickness from front to back to reduce the pressure drop across the assembly.

The helix angle and the pitch length of the vanes should be selected such that there is zero daylight from front to back of the deflector, so that influent particles cannot pass through the separator without being deflected from a straightthrough course.

The deflector preferably has a blunt tip at the upstream end, which protrudes beyond the vanes of the deflector for a distance of approximately 0.25 inch. This blunt tip is preferably a cylindrical rod, which is an extension of the hub and which has a flat end portion. A domed end can also be used. These configurations assist in guiding air toward the vanes of the deflector without increasing turbulence in the flow, and improve the efficiency of separation without adding to the pressure drop across the unit.

An upstream tip also can provide support for a guard screen across the inlet of the tubular body.

The downstream end of the deflector is provided with a rearwardly projecting conical tip, which extends beyond the vanes. This conical tip aids in creating the vortex stream by preventing turbulence in the air leaving the deflector, thereby improving the efficiency of separation. The conical tip should be formed to a cone angle of between 30° and 60° and preferably 36° and 50°. If the conical tip is formed to these angles, it will not add to the pressure drop across the vortex tube and efficiency will be increased. The cone angle as used here is the angle between the two sides of the cone and is thus twice the angle from one side to the axis.

material from the tubular body. Abrasion-resistant long-wearing materials, such as nylon, polyurethanes, polypropylene, and polycarbonates, as well as metals such as steel, stainless steel, nickel alloys, and the like, are preferred.

An outlet member is provided at the outlet end of the tubular body. This outlet member is generally tubular and is preferably frustoconical in shape. At the upstream end it is smaller in diameter than the tubular body, and this end extends into the outlet of the tubular body. The outlet member defines an annular space between itself and the tubular body at the periphery of the tube through which the dirt particles are removed. The central passage of the outlet tube is located at the center of the tubular body, and clean air is drawn from the assembly through the center of the outlet.

The outlet member should extend into the outlet end of the tubular body for a distance that is equal to from about 0.10 to about 0.25 times the diameter of the tube. The outlet member can be supported in position by tabs, which can be formed on the outlet member and extend to the separator body; it can also be supported by a back plate.

When the vortex air cleaner tubes are grouped in an array, one back plate can be employed to support the outlets of many tubular bodies.

It is also possible to provide a conically shaped lip on the end of the outlet member that is within the tubular body. This conically shaped lip can be used to align the outletmembers in the body, and can form a baffle to direct the dirt particles to the periphery of the tubular body for discharge. The conical lip can touch the tubular body at one point, and thus align the outlet member in the tubular body.

The cone angle used for the lip is preferably 32°, but any angle within the range of 20° to 40° is suitable.

The ratio of the outside diameter of the outlet tube to the inside diameter of the tubular body at the point where the outlet is located can be within the range from about 0.60 to about 0.97 inch.

Any means can be provided to remove particles from the assembly, such as a blower, leading to an orifice from the scavenge chamber which utilizes positive system pressure upstream of the air cleaner, to blow particles out the orifice, or a compressor or blower or ejector to discharge contaminants from the scavenge chamber. An educator or ejector is preferred. Scavenge flow can also be supplied using the supercharger compressed air to power an air ejector or eductor.

The barrier filter is of a material which can withstand elevated temperatures of at least 250°F. up to about 350°F.

Metal filters of high-melting metals such as aluminum, copper, iron, cobalt, nickel, palladium, tantalum and zinc, and high-melting alloys such as aluminum-copper, stainless steel, nickel-chromium, bronze, nickel-chromium-iron, nickel-iron-molybdenum, copper-manganese, and copper-nickel alloys are preferred: Wire mesh, perforated metal plates, sintered porous stainless steel, as disclosed in U.S. Pat. No. 2,554,343, dated May 22, 1951, to David B. Pall; rolled wire mesh, as disclosed in U.S. Pat. No. 2,423,547, dated July 8, 1947, to Behlen; sintered wire mesh, as disclosed in U.S. Pat. Nos. 2,925,650 and 3,049,796 to David B. Pall; and knitted wire mesh disclosed in British Pat. No. 1,268,446, published Mar. 29, 1972, to David B. Pall.

It is also possible to fabricate the filters from high-melting synthetic polymers, such as glass-reinforced polyethylene and polyvinyl chloride, polycarbonates, and polystyrene, polyoxy methylene, polystyrene-acrylonitrile, polyacetal, acrylonitrile rubbers, fluorocarbon rubbers, polyphenylene oxide, polysulfones, and acrylonitrile-butadiene-styrene polymers.

The filter also can be a paper sheet, made of cellulose fibers intermixed if desired with synthetic fibers, such as glass, quartz, potassium titanate, and like high-melting fibers, or a woven or nonwoven fibrous material of such fibers, such as glass cloth or glass bats and mats. The sheet can be resinimpregnated to increase strength, such as epoxy resin-polytetrafluoroethylene and silicone resin-impregnated paper.

The barrier filter can be composed of a single filter element or of a plurality of filter elements of the same or different characteristics. One can supplement the other, such that the first element removes only large particles, and the second all particles above a smaller minimum size passing through the first element. The elements can be of the same pore size, in which event the second is a reserve or backup element coming into service in case of rupture or blocking of the first element, improper installation, or installation damage. When there are two filter elements in series to each other, the first is referred to as the primary filter element, and the second as the secondary filter element.

The primary filter element is selected to meet the system requirements for incident particle removal. Some systems may require the removal of all incident particles as small as 1 micron in diameter. However, the primary filter element can remove a proportion of even smaller particles, down to 0.05 micron in diameter, or all of such particles, if required, or only considerably larger particles, if removal of such a high proportion of small particles is unnecessary. There is no upper limit, but filters having the ability to remove all particles of from 1 to 300 microns are generally useful.

It is preferred to form the primary filter element in pleats, convolutions or corrugations, so as to provide a greater surface area in a small volume.

The secondary filter element is selected for flow capacity, so as to pass the required volume of gas per unit time under the maximum flow demands of the system, and is preferably also selected so as to give the lowest incident particle removal ratings obtainable at such flow capacity.

The particle removal capability of the secondard filter element is in no way critical, and can range from 1 to 300 microns or higher, depending on the system parameters. Any of the materials described above for use in the primary filter element can also be employed for the secondary filter element, but with a larger pore diameter so as to have a higher micron removal rating, for the required greater flow capacity.

The secondary filter element also preferably is formed in pleats, convolutions or corrugations, for greater surface area.

The turbocharger compressor is of conventional type. A turbocharger compressor has a turbine component which is gas-operated to provide the rotational force needed to drive the compressor. The compressor component includes a vaned rotor which increases air pressure and density. The turbine can be operated by exhaust gases from the engine, and the rotational speed it imparts to the rotor controls the pressure and density of the turbocharged gaseous effluent. An aftercooler can be included to remove the heat of compression of the gaseous effluent. Turbocharger compressors are available for diesel, and fuel-injected and carbureted spark-ignition engines, and the air cleaner assemblies of the invention are useful with all three types of engines.

The air cleaner assembly shown in FIGS. 1 to 5 is composed of an array 1 of vortex-type air cleaners arranged in parallel, and a barrier filter 2, connected in series, upstream and downstream, respectively, of the supercharger compressor, in this case a turbocharger compressor 40.

The cylindrical housing 3 has an array of inlet ports 4. One end of the cylinder 3 is closed off by the hooded cap 5. The other end 6 of the cylinder is castellated, and flared slightly outwardly to fit over one of a concentric inner cylinder 7, which carries the array 1 of vortex air cleaners 8. The other end of cylinder 7 is castellated and fits over the bottom cap 9 which leads to the line connection 42 to the turbocharger compressor 40. The cylinder 3 is held to cylinder 7 by the ring 11, which fits over the outside of the cylinder 3, and the cylinder 7 to the cap 9 by the ring 12, which fits over the outside of cylinder 7 at the cap 9.

The cylinder 7 has an outlet or scavenge port 13 through which dirt-carrying scavenge air from the peripheral outlets of the vortex air cleaners 8 can be withdrawn via check valve 14. The check valve prevents back flow at low engine speeds through port 13 into the scavenge chamber, or in case of a break in a line.

The array 1 of vortex air cleaners 8 has the individual cleaners 8 supported between support plate 16 and support plate 17 held in spaced relation in cylindrical housing portion 7 within the castellated portion. The support plates 16 and 17 are shock-mounted to the housing 7 by rubber liners 19 disposed within channels 10 formed on the housing. The peripheries 21 of the plates 16 and 17 are flared, and embedded in these liners.

The support plates 16 and 17 are formed with a plurality of apertures 22 and 23, each of which accommodates an air cleaner tube 24, or outlet member 31. Each air cleaner tube 24 comprises a tubular body 25 having a central passage 26, an inlet 27, and an outlet 28. A vaned deflector 29 is disposed within the central passage 26 adjacent the inlet 27. The tubular body 25 is made of polypropylene.

The deflector 29 is also made of polypropylene, and is integrally molded with the tubular body 25. The vanes 30 of the deflector are helical.

A generally tapered tubular outlet member 31 is disposed with one end extending into the outlet 28 of the passage 26. The outlet member 31 has a central open passage 32 therethrough for the removal of clean air. The outlet member 31 defines an annular passage 33 within the tubular body 25 at the periphery of the tube 24, for the removal of air laden with dirt particles.

The peripheries of apertures 22 on the support plate 16 engage a flange 34 at the inlet 27 of the tubular body 25 of each vortex air cleaner 8. The peripheries of apertures 23 in the plate 17 snugly nest in a groove 35 on the outlet member 31 of each cleaner tube 24. The space 36 defines a scavenge chamber between the support plates 16 and 17, which communicates with the annular dirt scavenge passage 33 of each vortex air cleaner.

The scavenge chamber 36 has an air inlet 37 provided with a nozzle 38 leading a high pressure jet air flow from a compressor (not shown) into the open end of an ejector 39, whose other end connects with outlet 13 and check valve 14, for driving dirt-laden air in the chamber 36 through the outlet. The check valve 14 controls flow through the port 13 in the outgoing direction.

The central passages 32 of the outlet members 31 open on the other side of plate 17, into chamber 20 in the cap 9. The clean air from passages 32 of the outlet members is drawn off from space 20 through the outlet 41 at the narrow end of the cap 9, and can then pass through the line 42 to the turbocharger compressor 40.

The barrier filter 2 is arranged in series on the downstream side of the turbocharger 40, at the outlet end of line 43 from the turbocharger compressor 40. The barrier filter 2 has two cylindrical corrugated filter elements 56, 57 concentrically disposed within a cylindrical housing 50.

The housing 50 is composed of a bowl 51, with an inlet port 52 connected to line 43, and an outlet port 53 connected to the after-cooler (not shown). The open end of the bowl 50 is closed by the cap 54, held thereto by ring 55.

The corrugated cylindrical filter elements 56, 57 each have filter sheets 58 made of heat-resistant filter material, in this case epoxy resin-impregnated glass sheet, average pore size 1 micro. The open ends of each filter sheet cylinder are closed off by end caps 44, 45, 46, 47. The bowl 51 has a central stem 59 threaded at one end 60. The end cap 45 of element 56 and the end cap 47 of element 57 have a central aperture 61, 62 through which the stem 59 extends. The aperture 61 is sealed off by sealing ring 63 held in a leak-tight seal against the end cap 47 by the hexagonal nut 64. The aperture 62 is similarly sealed off by sealing ring 65 held in a leak-tight seal against end cap 45 by wing nut 66. Both elements are thus held in bowl 51 with their open interiors sealed off from the bowl at that end.

The end cap 44 of element 56 and the end cap 46 of element 57 each have apertures 67, 68 equal in diameter to outlet port 53, and seal against the bowl wall 69 in leak-tight seal due to gaskets 70, 71. Gasket 70 also seals off the annular space 72 between elements 56, 57 at end cap 44, so that air can enter and leave the space 72 only through the filter sheets 58.

It will be noted that as the pair of filter elements 56, 57 are assembled in the housing bowl 51, the inlet port 52 opens into the interior space 73 of bowl 51 onto the exterior of the first filter element 56, and the element is so mounted in the bowl that air from the inlet port must pass through the first filter sheet 58 in order to escape from this space 73. The annular space 72 on the interior of the first filter element 56 opens onto the exterior of the second filter element 57. The open space 74 on the interior of the second filter element 57 is connected to the outlet port 53 of the housing via apertures 67, 68 of end caps 44, 46, in a manner such that air, in order to escape through the outlet port, must pass through both the first and second filter elements. The second filter element 57 thus serves as a backup for the first, in the unlikely event of accidental failure or improper installation of the first element 56.

In operation, air passes through the ports 4 in the housing 3, and then into the inlet openings 27 of the vortex air cleaners 3, where a whirling vortex is formed by the vaned deflector 29, and the dirt is flung by centrifugal force toward the periphery of the central tube passage 26. The outlet member 31 separates the whirling air into a peripheral component and a core component. The peripheral air component laden with dirt emerges by way of the annular passage 33 between the outlet tube 31 and the tubular body 25 of each air cleaner 8, into scavenge chamber 36, and is driven into the open end of ejector 39, and down the ejector to and through the scavenge port 13, whence it escapes from the housing 7. The relatively clean air at the core of each air cleaner 8 is drawn off through the central passage 32 of the outlet tube 31 and the apertures 23 of the plate 17, entering the chamber 20, where it is withdrawn through the outlet 41 of the cap 9. The clean air then passes through the line 42 to the turbocharger compressor 40, and thence through the line 42 to the inlet port 52 of the barrier filter bowl 51. It then enters the annular space 73 between the inside of the bowl 51 and the exterior of the first filter element 56, passes through the first filter sheet 58 into the annular space 72 between the first filter element 56 and the second filter element 57, then through the second filter sheet 58 of element 57 into the space 74 on the interior of the second element, and finally emerges from the bowl 51 through the outlet port 3, whence it passes to the after-cooler (not shown).

The scavenge flow for the inertial air cleaner array also can be provided by way of the turbocharger. A small proportion of the turbocharged high-pressure air emerging from the compressor side of the turbocharger compressor via line 43 can be fed via nozzle 38 into the ejector 39 by way of the line 75, shown in dashed lines in FIG. 1. Scavenge flow also can be induced using an exhaust muffler ejector, if desired.

The air cleaner of the invention has numerous advantages, as compared to a conventional air cleaner. As an illustration of the advantages, the following Example is given:

EXAMPLE

The advantages of the air cleaner system of the invention can be shown with respect to a Detroit Diesel two-cycle 12 cylinder V-149 cubic inch displacement turbocharged internally-cooled engine by the following comparison. Assuming the engine is installed and operated at a turbocharger pressure ratio of 2.7:1, a compressor outlet temperature of 340°F., and an aftercooler outlet temperature of 235°F., under the flow conditions given in the Table, the results given are obtained. The air cleaner assembly shown in FIG. 1 is exemplary of the invention, as No. 3. As No. 1, the air cleaner used is exemplary of a conventional air cleaner system. As No. 2, the air cleaner assembly is the same as the invention, but both vortex-type precleaner and barrier filter components are upstream of the turbocharger compressor.

manifold density. Because of this, a reduced air horsepower is achieved, and the clean and dirty pressure restrictions are considerably higher. Moreover, as the turbocharger pressure ratio increases, the allowable air cleaner restrictions also increase. At a fixed inlet manifold pressure, the allowable air cleaner restrictions are considerably higher for the system of the invention, No. 3, as compared to the closest comparable conventional system, No. 2, with the barrier filter upstream of the compressor.

TABLE I

| Filter Assembly: | 1<br>Conventional System | 2<br>Vortex-type precleaner upstream screen barrier filter upstream | 3<br>Invention<br>Vortex-type precleaner upstream screen barrier filter downstream |
|---|---|---|---|
| Rated flow - CFM | 4800 | 4800 | 4800 |
| Scavenge flow - CFM | 480 | 480 | 480 |
| Turbocharger air-ejector nozzle flow | Alternate | 48 | 48 |
| Exhaust gas ejector | Yes | Alternate | Alternate |
| Precleaner EFF - % | 90±3 | 93±3 | 93±3 |
| Barrier filter EFF - % | 99.9 | 99.9 | 99.9 |
| Clean systems dp - "$H_2O$ | 11 | 4 | 8 |
| Dirty system dp - "$H_2O$ | 20 | 20 | 45.5 |
| Dirt holding at 20" $H_2O$ - gm/CFM | 21 | 31 | 56 |
| Air pumping cost at avg. dp & 2400 CFM - air flow $/Yr. | 220 | 172 | 120 |
| Inlet manifold density-lbs./ft.³ | Clean 0.143  Dirty 0.140 | Clean 0.146  Dirty 0.140 | Clean 0.147  Dirty 0.143 |
| Allow. inlet manifold temp. at const. density-°F | 235  235 | 250  235 | 250  256 |

On the basis of the foregoing data, the following conclusions can be drawn, as to comparative dirt-holding capacity, inlet manifold air density, inlet air system restriction, and inlet air pumping cost:

TABLE II

| Accrued Advantages | Trade-off Advantage | 1 | 2 | 3 |
|---|---|---|---|---|
| Smaller air cleaner package volume | Dirt holding | — | Nil | 35% less |
| Smaller aftercooler volume | Density | — | Nil | 33% less |
| Lower air pumping cost | dp | — | 21% less | 45% less |
| Increased dirt holding | dp | — | 48% greater | 170% greater |
| Increased HP (% ASP rating) | Density | — | Nil | 5% greater |
| Increase in dirty dp | Cost | — | Nil | 125% greater |
| Increased altitude performance | Density | — | Nil | 2200 feet greater |
| Inlet blower performance | Density | — | Nil | Improved | dp = differential pressure

It is quite surprising that such improvements could be obtained simply by locating the barrier filter downstream of the compressor, rather than upstream. It is apparent that the disadvantages of having to employ as the barrier filter a filter which is capable of withstanding high temperatures are more than offset by the operating advantages obtained. Placing the barrier filter downstream of the turbocharger gives an increased

I claim:

1. An air cleaner-supercharger-compressor assembly for supercharged engines including a supercharger compressor comprising, in combination, a vortex air cleaner, a supercharger compressor, and a barrier filter, each in series fluid flow connection with the other, and each having an inlet and an outlet; the outlet of the air cleaner being in fluid flow connection with the inlet of the supercharger-compressor, and the outlet of the supercharger-compressor being in fluid flow connection with the inlet of the barrier filter; the air cleaner being disposed upstream of the supercharger compressor, and the barrier filter being disposed downstream of the supercharger compressor, the barrier filter being capable of withstanding elevated temperatures of at least about 250° F to about 350°F.

2. An air cleaner assembly according to claim 1, in which the vortex air cleaner comprises a tubular air cleaner body having a central passage with an air inlet and an air outlet at opposite ends; a vaned deflector adjacent the inlet for creating a vortex stream in the influent air to concentrate any contaminant particles in the air at the periphery of the passage, and leave clean air at the center of the passage; and an outlet member having a central clean air passage communicating with the central passage of the tubular body and disposed within the passage at the outlet, the exterior wall of the outlet member defining a generally annular contaminant scavenge passage within the central passage of the tubular body through which pass contaminant particles while relatively clean air at the center of the passage passes through the central clean air passage of the outlet member.

3. An air cleaner assembly according to claim 1, comprising an array of vortex air cleaners mounted in parallel between a pair of supports which hold the tubular bodies of the vortex air cleaners with their air inlets and air outlets opening beyond the supports, and having scavenge passages emptying into a scavenge chamber defined between the supports, and a scavenge port in a wall of the scavenge chamber for the removal of air laden with dirt.

4. An air cleaner assembly according to claim 3, in which the scavenge chamber includes an eductor or ejector for driving air laden with dirt to and through the scavenge port.

5. An air cleaner assembly according to claim 1, in which the barrier filter is composed of a single filter element.

6. An air cleaner assembly according to claim 1, in which the barrier filter is composed of a plurality of filter elements in series or in parallel to each other.

7. An air cleaner assembly according to claim 1, in which the barrier filter element has a pore opening within the range from 1 to 300 microns.

8. A supercharger compressor assembly, according to claim 1, in which the supercharger compressor is a turbocharger compressor.

* * * * *